United States Patent [19]

Willis et al.

[11] 4,425,715

[45] Jan. 17, 1984

[54] THREAD GAGING APPARATUS AND METHOD

[75] Inventors: William Willis, South Pasadena; Clyde C. Chivens, Laguna Beach, both of Calif.

[73] Assignee: Hydril Company, Los Angeles, Calif.

[21] Appl. No.: 243,867

[22] Filed: Mar. 16, 1981

Related U.S. Application Data

[63] Continuation of Ser. No. 51,802, Jun. 25, 1979, abandoned.

[51] Int. Cl.³ ................................................ G01B 5/16
[52] U.S. Cl. ................................ 33/199 R; 33/174 Q
[58] Field of Search .............. 33/199 R, 199 B, 174 Q

[56] References Cited

U.S. PATENT DOCUMENTS

| | | |
|---|---|---|
| 1,614,448 | 1/1927 | Menforth et al. . |
| 1,864,634 | 6/1932 | Bradford . |
| 1,879,398 | 9/1932 | Mirfield . |
| 2,233,626 | 3/1941 | McClure . |
| 3,047,960 | 8/1962 | Mittenbergs et al. . |
| 3,091,867 | 6/1963 | Ryan ................................. 33/199 R |
| 3,590,492 | 7/1971 | Johnson . |
| 3,812,591 | 5/1974 | Michaud . |
| 3,989,284 | 11/1976 | Blose . |

FOREIGN PATENT DOCUMENTS

| | | |
|---|---|---|
| 390036 | 2/1924 | Fed. Rep. of Germany . |
| 483605 | 10/1929 | Fed. Rep. of Germany . |
| 2200432 | 10/1972 | Fed. Rep. of Germany . |
| 241025 | 8/1969 | U.S.S.R. . |

Primary Examiner—William D. Martin, Jr.
Attorney, Agent, or Firm—William W. Haefliger

[57] ABSTRACT

An instrument for gaging a first shoulder on a workpiece having an axis includes a support and holder means to releasably connect the support to the workpiece; the support includes datum structure to engage a second shoulder on the workpiece to establish an axial reference. A gaging part is provided to move into and out of engagement with the first shoulder on the workpiece; and a carriage for the gaging part includes a first section movable axially and a second section movable radially. The gaging part is mounted on one of the two sections that is carried by and movable independently of the other section. Means is operatively connected to at least one of the two sections to produce output indicative of the extent of movement of the gaging part.

14 Claims, 9 Drawing Figures

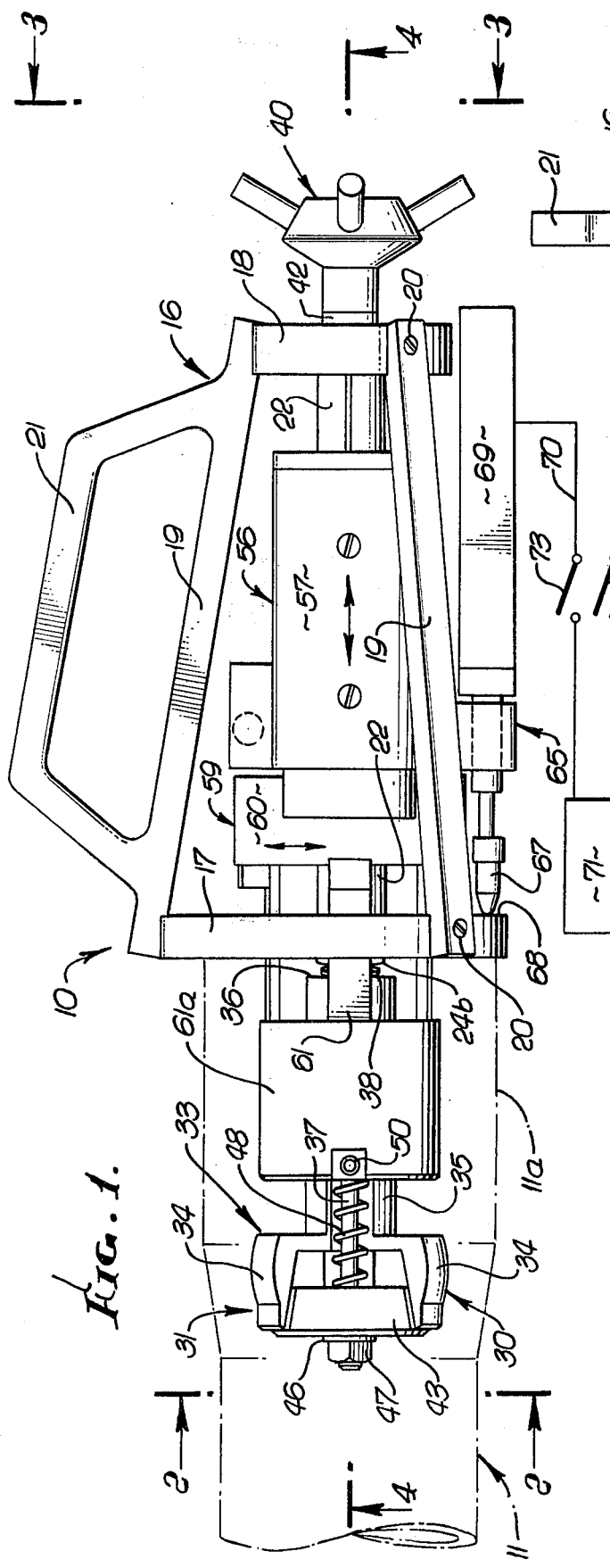
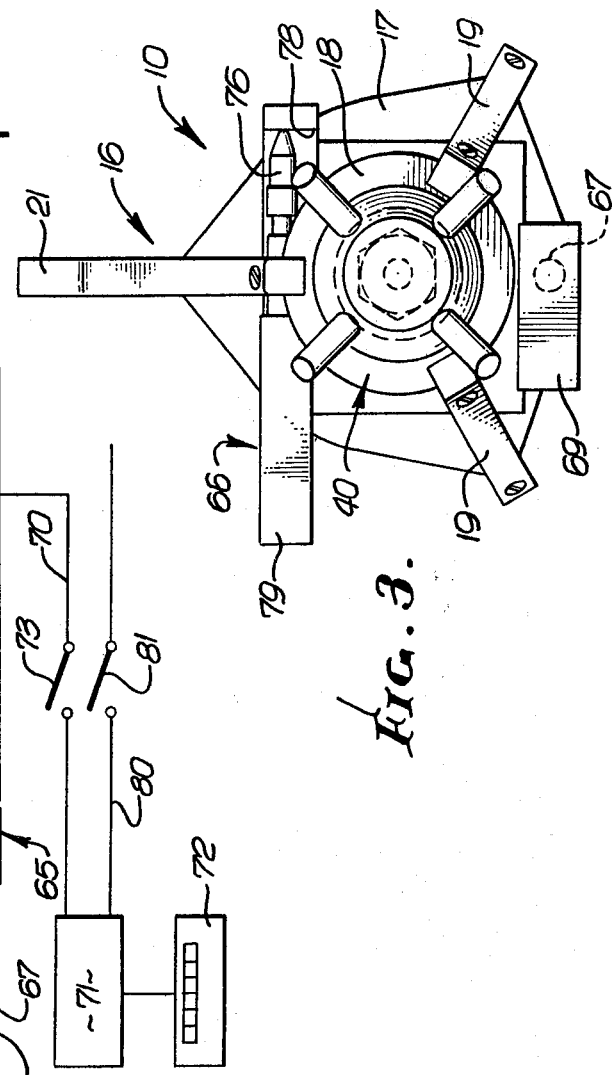
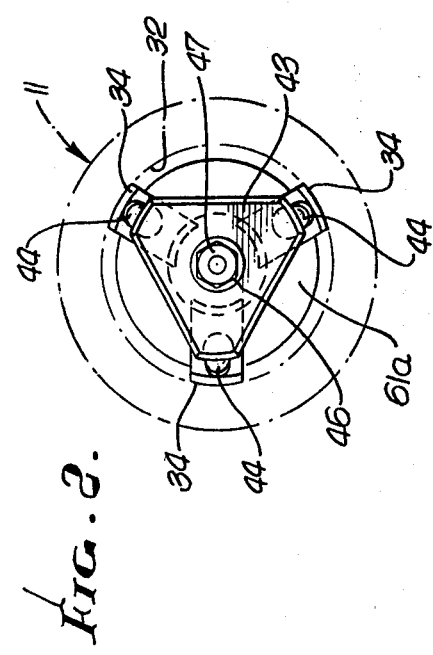

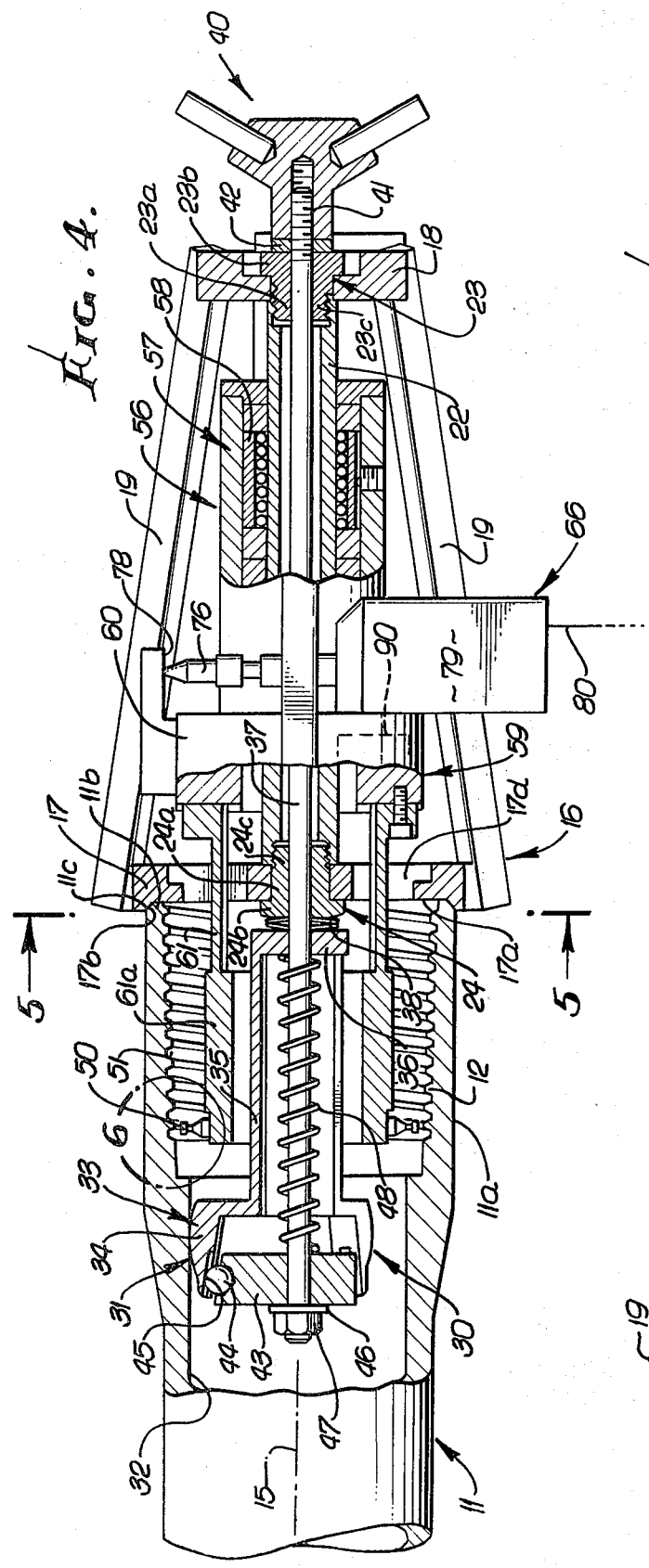
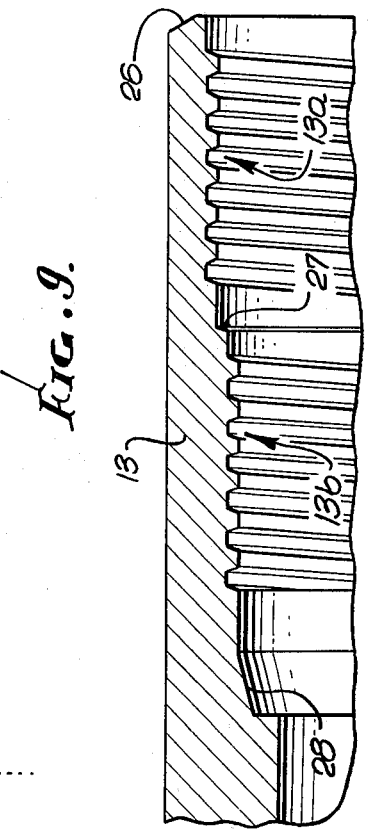
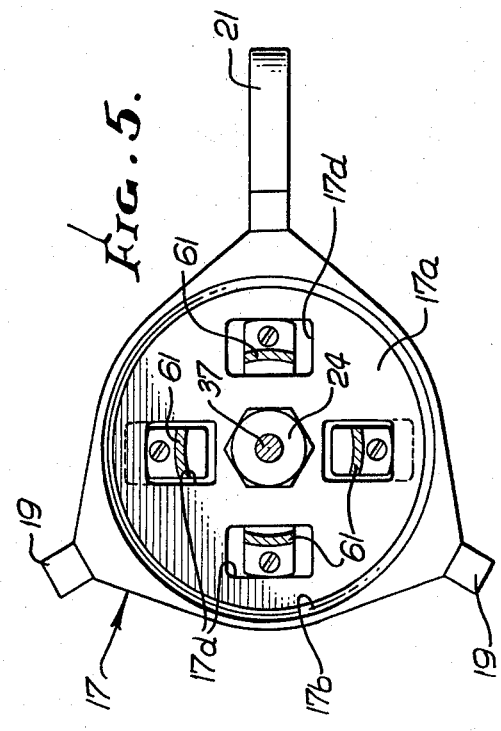

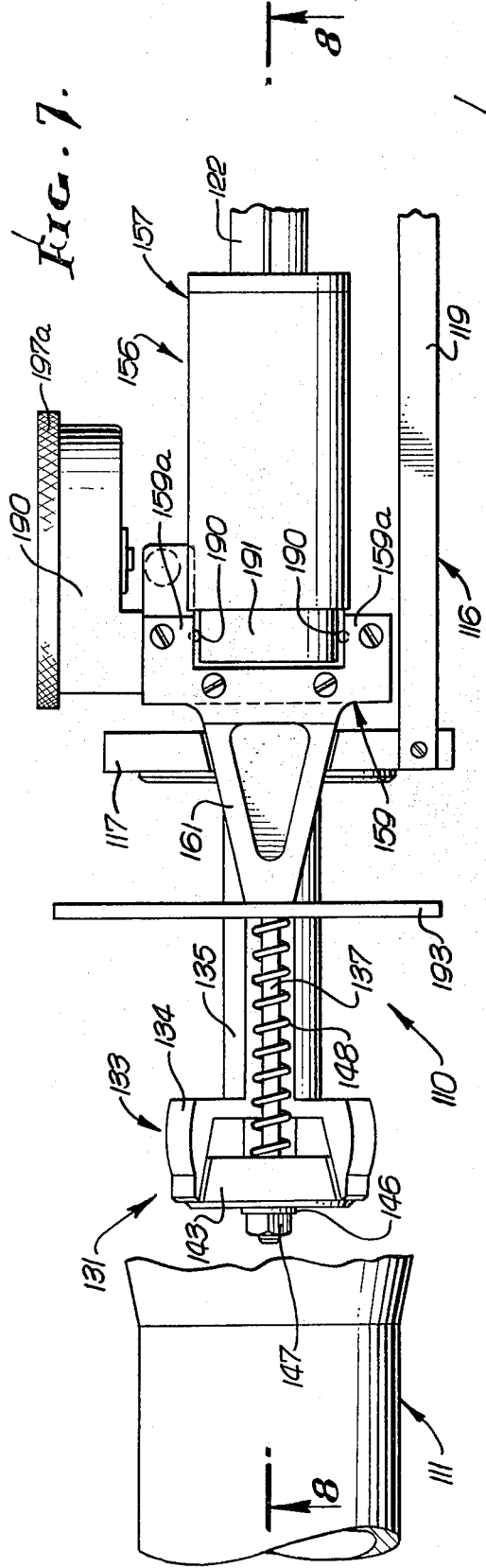
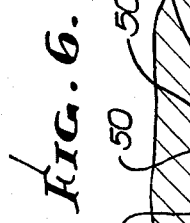
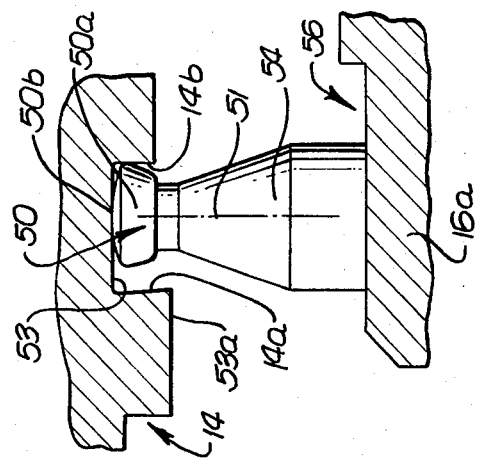
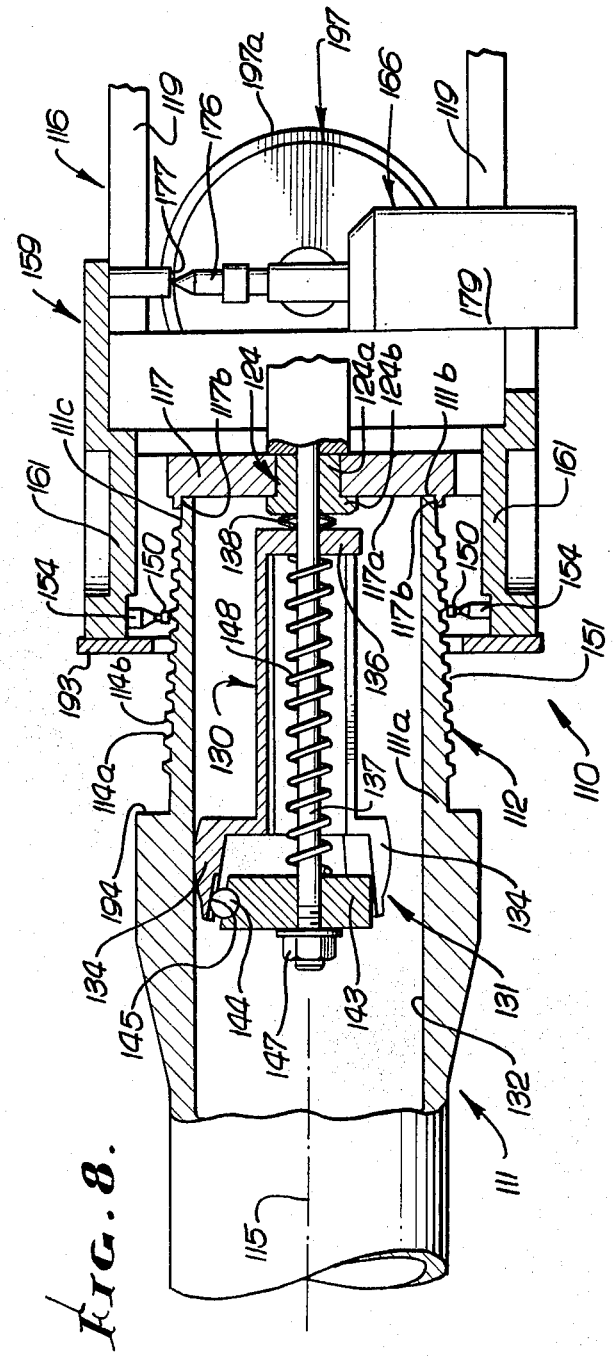

THREAD GAGING APPARATUS AND METHOD

This is a continuation of application Ser. No. 51,802, filed June 25, 1979, now abandoned.

BACKGROUND OF THE INVENTION

This invention relates generally to instrumentation for gaging the threads of workpieces; more particularly, it concerns tooling, typically portable, to accomplish rapid and accurate gaging of pipe threads, including thread flanks.

It is important in the cutting of threads on workpieces such as pipes to maintain dimensional accuracy of thread flank angularity and axial positioning along the thread length. If such accuracy is not maintained, make-up with a corresponding pin or box member becomes difficult, and can result in leakage at pipe joints. This becomes a serious problem in oil well tubular and casing joint applications at deep underground locations. The maintenance of thread flank dimensional accuracy is especially important in respect of a recently developed, highly advantageous thread known as the Blose thread, and described in U.S. Pat. No. 3,989,284.

Accordingly, it becomes important to be able to accurately and rapidly monitor or gage thread flanks as well as thread crests and root dimensions. While thread gages are known, none to my knowledge possess the unusually advantageous structural and functional advantages of the gage described herein.

SUMMARY OF THE INVENTION

It is a major object of the invention to provide a thread gage which meets the need described above through its capability for rapid attachment to a workpiece such as a pipe terminal to enable highly accurate gaging of thread flanks, and pipe or other workpiece diameters, shoulders and tapers. Basically, the gage comprises:

(a) support, and holder means to releasably connect the support to the workpiece, the support including datum structure adapted to fit a workpiece shoulder which faces generally in the direction of said axis, (b) a gaging part movable in the space between successive thread flights to be engageable with axially oppositely facing thread flanks, (c) a carriage for the gaging part, the carriage including a first section movable axially and a second section movable radially, the gaging part mounted on one of the sections that is carried by the other section, the one section being movable independently of said other section, and (d) means operatively connected to the sections to product outputs indicative of the extent of axial and radial movement of the sections.

As will appear, the holder means typically includes a clamp located for engagement with a radially presented surface of the workpiece, together with actuator means to urge the clamp into engagement with that surface and also to urge the datum structure into engagement with the workpiece shoulder, the clamp characterized as facilitating axial alignment of the datum structure and workpiece. Typically, the datum structure interfits the pipe end terminal telescopically for accurately locating the carriage structure in coaxial relation with the pipe, the portablility of the tool aiding in this objective.

It is another object to provide separate encoders to respectively sense and encode axial and radial movement of the gaging part, and wherein gaging accuracy is enhanced due to the capability of the gaging part to move radially on one carriage section independently of axial movement of the gaging part on another gaging part. The encoder outputs may be transmitted to computer or comparison means for comparison with ideal thread profiles, and readout of comparison results.

Further objects include the provision of instrumentation to gage both internal and external threads as well as other shoulders on work pieces, with a high degree of precision.

These and other objects and advantages of the invention, as well as the details of an illustrative embodiment, will be more fully understood from the following description and drawings, in which:

DRAWING DESCRIPTION

FIG. 1 is a side elevation view of apparatus embodying the invention;

FIG. 2 is a section taken in elevation on lines 2—2 of FIG. 1;

FIG. 3 is an end view taken in elevation on lines 3—3 of FIG. 1;

FIG. 4 is a section taken on lines 4—4 of FIG. 1;

FIG. 5 is an elevation taken in section on lines 5—5 of FIG. 4;

FIG. 6 is an enlarged view showing reception of a gaging part between thread flanks;

FIG. 7 is a view like FIG. 4, but showing a modification;

FIG. 8 is a section on lines 8—8 of FIG. 7; and

FIG. 9 is a modified thread section.

DETAILED DESCRIPTION

In the drawings a portable gaging tool or instrument is indicated at 10, for gaging the thread or shoulder of a workpiece. While various workpieces are contemplated, the example shown comprises a pipe 11 the box end 11a of which has an internal thread 12. The thread may have various forms, one example being shown in FIG. 4 as a single-step thread. A two-step thread is seen at 13a and 13b in FIG. 9, the pipe box end indicated at 13. The thread may also take the form as shown in U.S. Pat. No. 3,989,284 to Blose, the tool 10 having particularly advantageous utility for gaging such a thread form. FIG. 6 is an example of such a thread 14 characterized as having semi-dovetail or undercut flanks 14a and 14b which face one another. In FIG. 4, the pipe axis appears at 15.

The tool 10 includes a support, generally indicated at 16, the support in turn including a datum structure adapted to fit against a workpiece shoulder which faces generally in the direction of pipe axis 15. The illustrated datum structure comprises a first plate 17 which is recessed at 17a, and which has a frusto-conical internal shoulder 17b adapted to receive the terminal 11b of the pipe box end 11a. That terminal typically has a frusto-conical external shoulder 11c which closely interfits plate shoulder 17b, so that the plate 17 is approximately centered relative to the pipe and its axis, whereby the tool extends coaxially relative to the pipe when "made-up" to the pipe end terminal. This construction assures or enhances accuracy of thread gaging, both radially and axially, as will appear.

The illustrated support 16 also includes a second plate 18 co-axially spaced from the first plate and connected to the latter as via connector members 19 spaced about axis 15. In this regard, the plates 17 and 18 extend generally normal to axis 15, whereas members 19 extend generally in the direction of axis 15. Members 19 may be attached to the plates as by fasteners seen at 20 in FIG. 1. A handle 21 is made integral with one member 19 so that the tool may be easily transported to different pipe locations, and quickly coupled to the pipe ends in the manner described and to be described.

The support 16 may also be regarded as including axially elongated tube 22 extending between the plates, and tubular plugs 23 and 24 respectively attaching the opposite ends of the tube to the plates 17 and 18. The plugs include shanks 23a and 24a extending through plate bores, heads 23b and 24b engaging the plate sides, and threaded portions 23c and 24c interfitting corresponding tube threads.

Holder means is also provided to releasably connect the support 16 to the workpiece, or pipe. The holder means, typically includes a clamp located for engagement with a radially presented surface of the workpiece, and actuator means to urge the clamp into engagement with the workpiece surface and also to simultaneously urge the datum structure into engagement with the workpiece shoulder 11c. Such a locating shoulder may be at the end of the pipe, or spaced from the end of the pipe. See annular shoulders 26–28 in FIG. 9, for example.

In the drawings, the illustrated holder means generally designated at 30 includes a clamp 31 located within the pipe for engagement with radially presented bore surface 32 of the pipe. The clamp includes a collet 33 having three outwardly crowned jaws 34 respectively mounted on axially extending spring arms 35 spaced about axis 15, so as to be resiliently outwardly deflectible to clampingly engage bore 32. The arms extend from a base 36 slidably mounted on axially extending actuator rod 37. That rod extends through the tube 22 and through plugs 23 and 24, so as to be slidably mounted or carried by those plugs. Spring or Belleville washers 38 are also mounted on the rod and are located between the base 36 and the head 24b of plug 24, in order to be compressed so as to exert force to facilitate interfitting of the datum plate against the pipe terminal in response to actuation of the clamp, as will appear.

The actuator means referred to above may advantageously include the rod 37 and a pusher 43 mounted on that rod to urge the jaws toward and into clamping engagement with the pipe bore in response to relative axial displacement of the rod, i.e. in a relatively rightward direction in FIG. 4. For this purpose, an exposed handle 40 coupled to the rightward end of that rod may be displaced to effect rod displacement. In this regard, the handle may have threaded coupling at 41 to the rod, and also apply reaction load exerted on the plate 18 via washer 42, so that rotation of the handle urges the rod to the right. This serves to draw the pusher 43 to the right, exerting radially outward force on the jaws via coupling balls 44 carried by the pusher and engaging jaw ramps 45. Washer 46 and nut 47 retain the pusher 43 on the left end of rod 37.

The jaws are crowned and carried by arms 35 to allow slight cantilever rocking thereof as they are urged into clamping engagment with the pipe bore. Also, the Belleville springs allow leftward axial movement of plug 24 and datum plate 17 toward the base 36 after the clamp is anchored in position, whereby the datum plate can completely interfit the pipe terminal as the actuator handle is further rotated. The "crowning" of the jaws allows rocking thereof, when set, to the extent necessary to accommodate aligning and interfitting of the datum plate and pipe terminal shoulders 17b and 11c. A compression spring 48 on the rod between the pusher 43 and base 36 urges the pusher and rod leftwardly, to maintain the washer 42 compressed between handle 40 and plate 18.

As shown in FIGS. 4 and 6, at least one gaging contact part 50 is carried for axial and radial movement in the space 51 between successive thread flights, to be engageable with axially opposite thread flanks. See flanks 14a and 14b in FIG. 6, for example. That gaging part may have a full or partial ball surface, and in FIG. 6 it has a first surface 50a which is annular about radial axis 51, and a second surface 50b which is radially outwardly dome shaped and is centrally intersected by axis 51. Surface 50a is outwardly convex in planes which contain axis 51, so as to be adapted to have point contact with the thread flanks; thus, the distance between flanks 14a and 14b may be accurately determined, that distance for example varying along the thread length as in the above referenced Blose thread. Surface 50b is convex in the radially outward direction of axis 51, so as to be adapted to have point contact with the pipe surface 53 between the roots of the thread flights, for accurate root-depth gaging purposes. The thread crests 53a may be similarly engaged, for gaging. The gaging part 50 is mounted on a radially outwardly projection pedestal 54 which is in turn supported on a carriage. The curvature of convex surface 50a is substantially less than the curvature surface 50a in axial radial planes.

The carriage, generally indicated at 56, includes a first section movable axially, and a second section movable radially; further, the gaging contact part 50 and pedestal 54 are mounted on one of the carriage sections that is carried by the other carriage section, the latter being movable independently of the former. More specifically, the illustrated axially movable first section generally indicated at 57 is mounted via bearing 58 on the guide tube 22 so as to be movable axially thereon; also bearing 58 accommodate rotation of first section 57 on and about tube 22. Section 57 may also be tubular and extend coaxially with tube 22. The illustrated radially movable second section generally indicated at 59 is mounted via a linear bearing (indicated at 90 within housing 60) on the first carriage section, between plates 17 and 18. Housing 60 is radially movable, and axially movable relative to axis 15. The second section includes four frame members 61 which extend parallel to axis 51, and on opposite sides thereof, into the pipe, via openings 17d in plate 17. Two contact gaging parts, which are typically alike, are respectively carried by thickened portions 61a of the frame members 61, as seen in FIG. 4, so as to project radially outwardly, at opposite sides of axis 15. Accordingly, a selected one of the two gaging parts may be displaced radially into the space between successive thread flights, depending upon the direction of radial movement of the second carriage section. The latter may be manually manipulated, for example, by grasping the second carriage. Automatic means to displace one or both carriage sections may be provided. Axial displacement of the second carriage also moves it and the first carriage along the guide tube 22, to position the gaging parts relative to thread flanks selected for gaging. The use of two gaging parts, diametrically opposed, enables measurements on opposite sides of the pipe to determine the geometrical center line of the pipe. This can be important should the pipe terminal not be precisely normal to the pipe axis. Also, skewing of the instrument axis relative to the pipe axis can be detected.

Also provided is means operatively connected to the two carriage sections 57 and 59 to produce outputs indicative of the extent of axial and radial movement of the two sections. In this regard radial movement of section 59 is independent of axial movement of section 57, for maximum gaging accuracy. Such means may avantageously include axial encoder 65 and radial encoder 66. The former is shown in FIG. 1 to include a plunger 67 which is urged against the face 68 of datum plate 17 by a spring in a cylinder 69 within which the plunger is slidable. Since section 57 is rotatable about axis 15, the plate 17 provides annular extent about axis 15 for engagement with plunger 67.

A suitable magnetic encoding curcuit is located within the cylinder 69, as for example may include a linear differential transformer, with linear voltage output. The output of that circuit, indicated at lead 70, is transmitted to circuitry 71 which includes a computer and which appropriately digitizes the output of the transformer, for comparison with ideal thread flank position data, and comparative readout at 72, for example. In this regard, it is clear that the encoder accurately senses the different positions of the thread flanks that a gaging part 50 engages. Merely as illustrative, a switch 73 in lead 71 may be closed whenever the position of the gaging part in engagement with a thread flank is to be encoded and transmitted to the computer.

Similarly, the radial encoder 66 shown in FIG. 4 includes a plunger 76 which is urged against a stop 78 on radially movable housing 60 by a spring in a cylinder 79 within which a portion of the plunger is slidable. That cylinder is attached to axially movable section 57 so as not to be radially movable. A suitable magnetic encoding circuit is located within the housing 79, and the circuit output on lead 80 is transmitted to computer 71 when switch 81 is closed. Such output is compared in the computer with ideal thread flank radial dimension data (which may vary along the thread, for example). Thread crest and root data may also be transmitted to the computer. Readout is obtained at 72, as previously described.

Referring to FIGS. 7 and 8, the modified portable tool 110 is adapted to gage a workpiece thread or shoulder that is radially outwardly exposed, as for example external thread 112 on pin end 111*a* of pipe 111. As before, that thread may have various forms, one example being the single-step thread shown in FIGS. 7 and 8. Also, the thread may take the form as shown in Blose U.S. Pat. No. 3,989,284 mentioned above.

The tool 110 includes a support, generally indicated at 116, the latter including datum structure adapted to fit against the end of pipe 112; for example, datum plate 117 is recessed at 117*a* to have frusto-conical internal shoulder 117*b* to receive the terminal 111*b* of the pipe pin end 111*a*. That terminal has a frusto-conical external shoulder 111*c* which closely and telescopically interfits plate shoulder 117*b*, so that the support plate is precisely centered relative to the pipe and its axis 115. As before, accuracy and precision of pipe thread or shoulder gaging is thereby made possible.

Support 116 also may include a second plate (not shown) like plate 18 described above, and connected to plate 117 via connector members 119 spaced about axis 115. A suitable handle for the tool may be provided, and corresponding to handle 21 in FIG. 1.

The support 116 includes axially elongated tube 122 extending between the described first and second plates. Plug 124 with shank 124*a* extends through plate 117, these parts 122 and 124 correspond to parts 22 and 24 in FIG. 4.

Holder means 130 is also provided, as before, to releasably connect the support 116 to the workpiece, such as pipe 110. That holder means typically includes a clamp 131 and actuator means, functioning as described above. Accordingly, corresponding parts are given the same numbers, with the addition of a "1" before the corresponding number.

At least one gaging contact part 150 is carried for axial and radial movement in the space between 151 between successive external thread flights to be engageable with opposite thread flanks. See flanks 114*a* and 114*b*. That gaging part may have a construction the same as, or similar to, that of part 50, described above; however, the part 150 is instead presented radially inwardly rather than radially outwardly. Part 150 is carried on pedestal 154. Thus, thread crests and roots, as well as flanks, may be accurately gaged, and axially and radially facing shoulders on the pipe or workpiece may also be precisely gaged. Two gages 150, at opposite sides of axis 115, are shown and may be alternately used for rapid gaging purposes (i.e. so as not to require 180° rotation of one gage 150 and the carriage therefor, about axis 115, to gage the thread or shoulder extent at the opposite side of axis 115).

The illustrated carriage 156 for the gaging part 150 includes first and second sections 157 and 159 generally corresponding in structure and mode of operation to respective sections 57 and 59 described above. The radially movable section 159 is shown in FIG. 7 as including yoke arms 159*a* movable radially and perpendicularly to the plane of FIG. 7, there being bearings 190 between such arms and guide part 191 of section 157. The latter is movable axially relative to axis 115, as before.

Second section 159 includes frame members 161 (corresponding to members 61 in FIG. 4) which extend parallel to axis 115, and at opposite sides of the latter to carry two gaging parts 150 and their pedestals, as shown, exteriorly of the pipe pin end. An annular ring 193 may be provided at the free ends of frame members 161, to protect the gaging parts 150 against inadvertently striking against pipe upset shoulder 194.

Axial and radial encoders are als provided, to correspond in structure and function to corresponding encoders 65 and 66. Radial encoder 166 is shown to include plunger 176 urged against stop 177 on radially movable housing or yoke 159 by a spring within cylinder 179 within which a portion of the plunger is slidable. That cylinder is attached to axially movable section 157 so as not to be radially movable toward and away from axis 115.

A guiding handle 197 is provided on the section 159, with a sidewardly presented and graspable knurled ring 197*a*, to facilitate accurate axial and radial guided travel of the gaging part 150.

We claim:

1. In an instrument for gaging surfaces of a workpiece having a thread extending about an axis, the combination comprising
   (a) a support including datum structure adapted to fit a workpiece shoulder which faces generally in the direction of said axis, the support also including a centrally and axially extending cylindrical guide member, a clamp engageable with a radially presented surface of said workpiece, and an axially extending actuator operatively connected with said clamp to cause the clamp to forcibly engage said workpiece surface, (b) a carriage including a first section movable axially on said cylindrical member and a second section movable radially, one of said sections being carried by the other section, the one section being movable independently of said other section, (c) a gaging part carried by said one section to be movable therewith both axially and radially to engage and gage different surfaces of said thread, and (d) means operatively connected to said sections to produce outputs indicative of the extents of both axial and radial movements of the gaging part, said means including a first encoder operatively connected to the carriage first section to sense and encode axial movement thereof relative to the datum structure, and a second encoder operatively connected to the carriage second section to sense and encode radial movement thereof, each encoder including linearly relatively movable guide elements.

2. The combination of claim 1 wherein said cylindrical member is tubular and said actuator extends therein.

3. The combination of claim 2 wherein said actuator includes an actuator rod extending axially through the datum structure.

4. The combination of claim 3 wherein the workpiece comprises a pipe having a bore, the clamp includes jaw means to clamp against the pipe bore, and the actuator includes a pusher on the rod to urge the jaw means toward the pipe bore in response to axial displacement of said rod.

5. The combination of claim 2 wherein the workpiece comprises a pipe having an end shoulder, the datum structure having a frusto-conical shoulder adapted to interfit said pipe end shoulder which is also frusto-conical.

6. The combination of claim 5 including said pipe with said pipe end shoulder and said datum structure shoulder in telescopically interfitting relation.

7. The combination of claim 1 wherein support includes a handle.

8. The combination of claim 5 wherein said support includes a handle integral with said datum structure.

9. The combination of claim 1 wherein said gaging part is mounted on said second section.

10. The combination of claim 9 wherein the datum structure is defined by a first plate, and said support includes a second plate axially spaced from the first plate and connected thereto, said actuator at least in part supported by said second plate.

11. The combination of claim 1 wherein said gaging part is radially presented for movement in the space between successive thread flights.

12. The combination of claim 4 wherein said clamp and pusher are located at one end of the cylindrical guide member and there being an actuator handle at the opposite end of the guide member.

13. The combination of claim 4 wherein the clamp includes collet structure carrying the jaw means, and yieldable means between the collet structure and datum structure to accommodate movement of the datum structure relatively toward the collet structure and centering alignment of the datum structure relative to the workpiece after the jaw means is clamped against the pipe bore.

14. The combination of claim 1 wherein the gaging part has an axis, a convex end wall intersecting said axis, and a side wall extending annularly about said axis, said side wall being outwardly convex away from said gaging part axis, the curvature of said convex end wall being substantially less than that of said convex side wall, in axial radial planes.

* * * * *